United States Patent
Maeng

(10) Patent No.: US 11,716,355 B1
(45) Date of Patent: Aug. 1, 2023

(54) COMPANY CONTROLLED VIRTUAL COMPUTER OVER A NETWORK

(71) Applicant: Wells Fargo Bank, N.A., San Francisco, CA (US)

(72) Inventor: Joon Maeng, Newcastle, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 302 days.

(21) Appl. No.: 17/103,763

(22) Filed: Nov. 24, 2020

(51) Int. Cl.
| | |
|---|---|
| *H04L 29/06* | (2006.01) |
| *H04L 9/40* | (2022.01) |
| *G06F 9/455* | (2018.01) |
| *G06N 20/00* | (2019.01) |
| *G06Q 50/18* | (2012.01) |

(52) U.S. Cl.
CPC .......... *H04L 63/20* (2013.01); *G06F 9/45558* (2013.01); *G06N 20/00* (2019.01); *H04L 63/0272* (2013.01); *H04L 63/0876* (2013.01); *H04L 63/102* (2013.01); *G06F 2009/45595* (2013.01); *G06Q 50/18* (2013.01)

(58) Field of Classification Search
CPC . H04L 63/20; H04L 63/0272; H04L 63/0876; H04L 63/102; G06F 9/45558; G06F 2009/45595; G06N 20/00; G06Q 50/18
See application file for complete search history.

(56) References Cited

U.S. PATENT DOCUMENTS

| | | | |
|---|---|---|---|
| 8,949,929 B2 | 2/2015 | Kelly et al. | |
| 9,521,117 B2 | 12/2016 | Barton et al. | |
| 10,397,275 B2 | 8/2019 | Jain et al. | |
| 10,652,247 B2 | 5/2020 | Kelly et al. | |
| 2006/0120526 A1* | 6/2006 | Boucher | H04L 63/12 380/247 |
| 2014/0007222 A1* | 1/2014 | Qureshi | H04L 67/10 726/16 |

(Continued)

FOREIGN PATENT DOCUMENTS

CN        107015834 A        8/2017

OTHER PUBLICATIONS

D'Arcy, "CIO Strategies for Consumerization: The Future of Enterprise Mobile Computing", Mar. 2011, Dell CIO Insight Series, 13 pp.

*Primary Examiner* — Baotran N To
(74) *Attorney, Agent, or Firm* — Shumaker & Sieffert, P.A.

(57) ABSTRACT

A virtual computer application at a computing device may establish a secure communications channel between the computing device and a private network. The virtual computer application may determine one or more policies that specify one or more actions permitted to be performed by the computing device on documents in the private network based at least in part on context information associated with the computing device. The virtual computer application may determine whether to allow an action to be performed by the computing device on a document in the private network based at least in part on the one or more actions specified by the one or more policies. The virtual computer application may, in response to determining that the action to be performed on the document is not allowed, prevent the computing device from performing the action on the document.

18 Claims, 3 Drawing Sheets

(56) References Cited

U.S. PATENT DOCUMENTS

| | | | |
|---|---|---|---|
| 2014/0109171 A1* | 4/2014 | Barton | H04L 63/0807 726/1 |
| 2015/0222665 A1* | 8/2015 | Eberlein | H04L 63/10 726/1 |
| 2018/0255591 A1* | 9/2018 | Valicherla | H04L 12/4641 |
| 2018/0330080 A1 | 11/2018 | Dong et al. | |
| 2020/0394327 A1* | 12/2020 | Childress | G06F 16/1824 |

* cited by examiner

COMPANY CONTROLLED VIRTUAL COMPUTER OVER A NETWORK

TECHNICAL FIELD

The invention relates to techniques for using a virtual computer application to control a computing device.

BACKGROUND

An organization such as a company, institution, or government entity may enable employees and other users associated with the organization to use computing devices remotely connected to the organization's internal computer network to access resources such as e-mails, documents, and applications within the internal computer network. In general, the organization or the user of a computing device may install software, such as software for providing a remote desktop or software for providing a virtual private network (VPN) connection with the private network, that enables the computing device to authenticate with and connect to the organization's internal computer network.

SUMMARY

In general, this disclosure describes techniques for controlling a computing device that accesses an organization's internal computer network in ways that potentially improve the security of the computing device and the organization's internal computer network. A computing device may execute a virtual computer application that authenticates the user of the computing device with the organization's computer network and that, upon successful authentication, provides access, via a secure connection, to documents in the organization's internal computer network.

The documents in the organization's internal computer network may contain potentially sensitive or confidential information, such as the organization's financial data, employee records, source code, product roadmaps, trade secrets, and the like. While user authentication may provide a level protection against access of the internal computer network by unauthorized users, user authentication by itself may not prevent bad acts by authorized users, such as an employee copying or printing documents containing confidential information in the internal computer network that the employee intends to sell or otherwise transfer to a competitor. Similarly, user authentication by itself may also not prevent malicious actors from hacking a computing device that accesses the private network to access documents in the private network accessed by authenticating an authorized user.

As such, in accordance with aspects of the present disclosure, a virtual computer application that executes at a computing device to provide a user of the computing device access to documents in the private network may implement one or more policies that control functionalities of the computing device, including controlling the actions that can be performed on documents in the private network by the user of the computing device. For example, the one or more policies may control whether the computing device can open, edit, save, and/or print one or more documents in the private network.

In some examples, the virtual computer application may determine one or more policies to implement based on context information associated with the computing device, such as the location of the computing device, the time of day, the identity of the user of the computing device, or other characteristics of the computing device. By determining the one or more policies based on context information associated with the computing device, the policies implemented by the virtual computer application may be context-specific and may change as the context information associated with the computing device changes. For example, the virtual computer application may implement different policies as the computing device changes location, so that if the computing device is at a location that is known for having computing devices hacked by computer hackers, the virtual computer application may determine one or more policies based on the location of the computing device that restricts the actions that may be performed by the computing device on documents in the virtual network in order to decrease the chance that a hacker may be able to use the computing device to hack into the private network.

In some examples, the virtual computer application may also determine one or more policies to implement based on the contents of documents in the private network. That is, the virtual computer application may determine, for a document in the private network, the actions that can be performed by the computing device on the document based on the contents of the document itself. For example, the virtual computer application may be able to classify a document, based on the contents of the document, as a confidential document or a non-confidential document. If the virtual computer application classifies a document as a confidential document, the virtual computer application may implement one or more policies that apply to a confidential document that may restrict the actions that may be performed by the computing device on the document. Conversely, if the virtual computer application classifies a document as a non-confidential document, the virtual computer application may implement one or more policies that apply to a confidential document that may enable the computing device to perform relatively more actions on the document The techniques described herein may provide one or more technical advantages. For example, by determining policies that control the actions that can be performed on a document in the private network based on context information associated with the computing device and on the contents of the document itself, the techniques described herein enable the virtual computer application to adaptively tailor the actions that can be performed by the computing device on documents in the private network to the documents accessed by the computing device and to changes in the condition of the computing device. Being able to adaptively tailor the actions that can be performed by the computing device on documents in the private network may increase the security of the computing device while decreasing the chance that sensitive or privileged resources in the private network can be misappropriated, such as by limiting the actions that can be performed by the computing device on highly confidential documents in high risk locations while enabling the computing device to perform a greater amount of actions on less confidential documents in lower risk locations.

In one aspect, a method includes establishing, by a virtual computer application at a computing device, a secure communications channel between the computing device and a private network. The method further includes determining, by the virtual computer application, one or more policies that specify one or more actions permitted to be performed by the computing device on documents in the private network based at least in part on context information associated with the computing device. The method further includes determining, by the virtual computer application, whether to allow an action to be performed by the computing device on a document in the private network based at least in part on the one or more actions specified by the one or more policies. The method further includes in response to determining that the action to be performed on the document is allowed, enabling, by the virtual computer application, the computing device to perform the action on the document.

In another aspect, a computing device includes memory configured to store a virtual computer application. The computing device further includes one or more processors in communication with the memory and configured to execute the virtual computer application to: establish a secure communications channel between the computing device and a private network; determine one or more policies that specify one or more actions permitted to be performed by the computing device on documents in the private network based at least in part on context information associated with the computing device; determine whether to allow an action to be performed by the computing device on a document in the private network based at least in part on the one or more actions specified by the one or more policies; and in response to determining that the action to be performed on the document is allowed, enable the computing device to perform the action on the document.

In another aspect, a non-transitory computer-readable storage medium storing instructions of a virtual computer application that, when executed, cause one or more processors of a computing device to: establish a secure communications channel between the computing device and a private network; determine one or more policies that specify one or more actions permitted to be performed by the computing device on documents in the private network based at least in part on context information associated with the computing device; determine whether to allow an action to be performed by the computing device on a document in the private network based at least in part on the one or more actions specified by the one or more policies; and in response to determining that the action to be performed on the document is allowed, enable the computing device to perform the action on the document.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
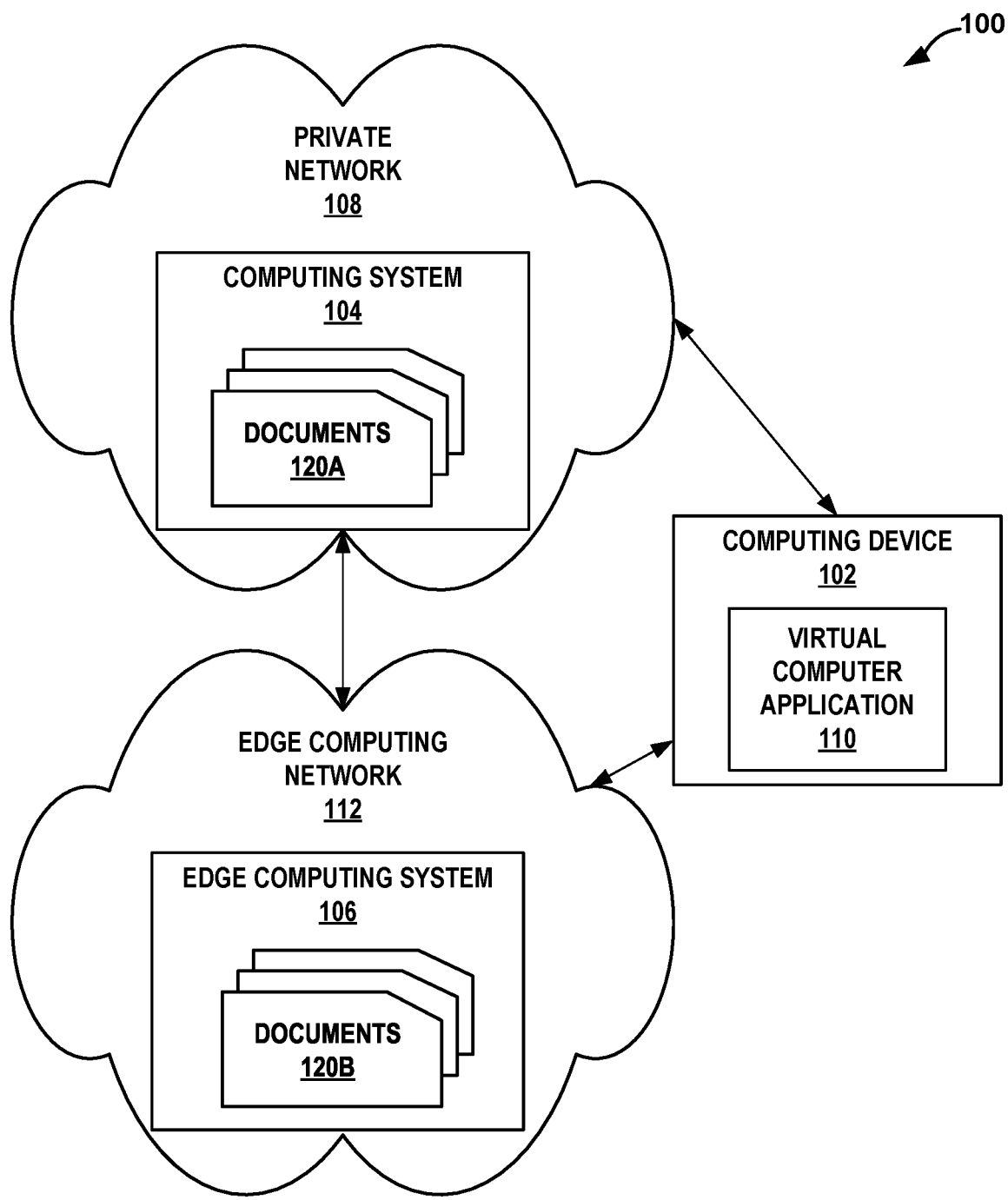
FIG. 1 is a conceptual diagram illustrating a system including a virtual computer application that implements policies at a computing device that controls the computing device's access to an organization's private computer network, in accordance with aspects of the present disclosure.

FIG. 1 is a conceptual diagram illustrating a system including a virtual computer application that implements policies at a computing device that controls the computing device's access to an organization's internal computer network, in accordance with aspects of the present disclosure. As shown in FIG. 1, system 100 includes computing device 102 that may communicate with private network 108 to access resources in private network 108. Computing device 102 may include smart phones, tablets, laptop computers, desktop computers, adaptors for smart phones, wireless hubs, routers, and the like that may communicate over one or more networks with private network 108. In some examples, computing devices 102 may be connected or otherwise operably coupled to peripherals or other endpoint devices (not shown) that may communicate with computing device 102 to, for example, act as input and/or output devices for computing device 102 or to access private network 108 via computing device 102.

Private network 108 may be a private computer network contained within an organization or enterprise, such as companies, schools, government entities, and the like, for securely sharing company information and resources such as computing devices, documents, software applications, and the like, among members of the organization. In some examples, private network 108 may be implemented as a centralized or distributed network of computing devices and systems.

Private network 108 may include, amongst the resources of private network 108, computing system 104 that includes one or more computing devices, servers, and the like, such as a cloud computing system. In some examples, computing system 104 may store company information and resources such as computing devices, documents, software applications, and the like. In some examples, private network 108 may use edge computing technology to bring computing resources closer to remote users of private network 108. For example, private network 108 may communicate with edge computing network 112 via networks such as the Internet to utilize edge computing network 112 that is physically located closer to computing device 102 compared with private network 108 to communicate with computing device 102. For example, edge computing network 112 may be cellular communications infrastructure, such as a 5G network backbone that contains edge computing system 106 at the edge of edge computing network 112 that is physically close to computing device 102 to communicate with computing device 102, such as via a cellular network (e.g., a 5G wireless network). While edge computing network 112 is illustrated in FIG. 1 as being separate from private network 108, edge computing network 112 may be considered a part of private network 108, and references to "private network 108" throughout this disclosure may refer to both private network 108 and edge computing network 112.

Similar to computing system 104, edge computing system 106 may include one or more computing devices, servers, and the like that operate to authenticate computing devices, such as computing device 102, that attempt to access private network 108 to determine whether to grant or deny access to private network 108 and to store company information and resources such as computing devices, documents, software applications, and the like. If edge computing system 106 successfully authenticates a computing device to grant the computing device access to private network 108, edge computing system 106 may communicate with computing system 104 to transmit, to computing system 104, the details of the computing device that has been granted access to private network 108.

Computing device 102 may include virtual computer application 110 that executes on computing device 102 for connecting to private network 108 and to access organizational resources of private network 108. For example, virtual computer application 110 may execute at computing device 102 to access documents 120A and 120B (hereafter "documents 120") in private network 108. Virtual computer application 110 may be executable program code, such as a software application, kernel extensions, libraries, operating system-level software, and the like that computing device 102 may execute to communicate and connect with private network 108.

Virtual computer application 110 may execute at computing device 102 to provide remote access functionality for users to access resources in private network 108. For example, virtual computer application 110 may execute to provide remote desktop functionality, virtual desktop functionality, virtual private network (VPN) functionality, and the like to enable users of virtual computer application 110 to access and interact with resources in private network 108. For example, virtual computer application 110 may provide functionality, such as in the form of a graphical user interface (GUI), for users to read and write certain files (e.g., documents 120) in private network 108, execute certain applications in private network 108, access certain computer systems in private network 108, and the like.

To access private network 108 using virtual computer application 110, a user of computing device 102 may use virtual computer application 110 to authenticate with private network 108. For example, the user may provide user input that corresponds to user credentials, such as a username and password, biometric data associated with biometric features of a user, such as a fingerprint or facial features of the user, and the like that may be used to authenticate the user with private network 108.

Virtual computer application 110 may, in response to successfully authenticating with private network 108, establish a secure communication channel between computing device 102 and private network 108, such as by establishing a secure communication channel with computing system 104 and/or edge computing system 106. For example, virtual computer application 110 may establish a virtual provider network (VPN) connection with computer system 104 and/or edge computing system 106, to communicate with private network 108 to enable computing device 102 to access documents 120 in private network 108.

In some examples, virtual computer application 110 may also provide virtual desktop functionality with which the user may interact to access resources in private network 108. For example, virtual computer application 110 may provide a virtual desktop in the form of a graphical user interface that presents desktop computing user interfaces familiar to the user of computing device 102, such as desktop computing user interfaces of Microsoft Windows or Apple macOS desktop operating systems, with which a user may interact to browse private network 108 and to access resources in private network 108. In the examples where computing device 102 is a mobile computing device, computing device 102 may be connected to peripherals such as a monitor, a keyboard, a mouse, and the like, and virtual computer application 110 may output the virtual desktop for display at the monitor connected to computing device 102. A user of computing device 102 may interact with the virtual desktop presented by virtual computer application 110 to, for example, access documents 120 stored in private network 108.

In accordance with aspects of the present disclosure, virtual computer application 110 may, when connected to private network 108, such as via a secure communication channel, implement one or more policies at computing device 102 to control the functionality of computing device 102 associated with accessing resources in private network 108, where a policy may specify one or more actions that computing device 102 is allowed to perform and/or specify one or more actions that computing device is not allowed to perform. For example, if virtual computer application 110 implements one or more policies at computing device 102, virtual computer application 110 may determine, such as in response to an action being performed on a document in private network 108, whether to allow the action to be performed on the document based at least in part on the one or more actions specified by the one or more policies.

If virtual computer application 110 determines that the action to be performed on the document is allowed according to the one or more policies, virtual computer application 110 may, in response to determining that the action to be performed on the document is allowed, enable computing device 102 to perform the action on the document. Conversely, if virtual computer application 110 determines that the action to be performed on the document is not allowed according to the one or more policies, virtual computer application 110 may, in response to determining that the action to be performed on the document is not allowed, prevent computing device 102 from performing the action on the document.

Policies implemented by virtual computer application 110 at computing device 102 may be configured by the organization and installed in or accessed by virtual computer application 110 in order to increase the security of computing device 102 and private network 108 while decreasing the chance that sensitive or privileged resources in private network 108 can be misappropriated using computing device 102. In some examples, the policies may be stored in private network 108, and virtual computer application 110 may access the policies in private network 108 by communicating with private network 108 upon establishing a secure communication channel with computing system 104 and/or edge computing system 106.

In some examples, the one or more policies may control the use of and/or functionality of peripherals connected to computing device 102, such as printers, microphones, cameras, flash drives, external hard drives, as well as the ability of computing device 102 to use peripherals connected to computing device 102. In some examples, the one or more policies may restrict or control the ability of computing device 102 to print to a printer connected to computing device 102. In some examples, virtual computer application 110 may implement a policy that prevents computing device 102 from printing documents 120 in private network 108 to a printer connected to or accessible to computing device 102, or may implement a policy that prevents computing device 102 from printing any documents to a printer connected to or accessible to computing device 102.

In some examples, the one or more policies may restrict or control the ability of computing device 102 to save files to external storage devices, such as flash drives, external hard drives, network attached storage devices, and the like, connected to computing device 102. In some examples, virtual computer application 110 may implement a policy that prevents computing device 102 from saving documents 120 in private network 108 to an external storage device connected to or accessible to computing device 102, or may implement a policy that prevents computing device 102 from storing any documents, such as any documents stored in computing device 102, to an external storage device connected to or accessible to computing device 102.

In some examples, virtual computer application 110 may implement one or more policies via use of operating system extensions, such as loadable kernel modules, kernel extensions, kernel-mode drivers, and the like associated with virtual computer application 110, in the operating system of computing device 102. If operating system extensions associated with virtual computer application 110 are installed in in the operating system of computing device 102 to control the use of and/or functionality of peripherals connected to computing device 102, such as the ability for computing device 102 to save files to external storage devices connected to computing device 102 or the ability for computing device 102 to print to a printer connected to computing device 102, virtual computing application 110 may determine that virtual computer application 110 is able to control the operating system-level functionalities of computing device 102.

However, if virtual computer application 110 is not able to control the use of and/or functionality of peripherals connected to computing device 102, such as not having operating system extensions associated with virtual computer application 110 installed in the operating system of computing device 2, virtual computer application 110 may, in response to determining that virtual computer application 110 is not able to control the operating system-level functionalities of computing device 102, reduce the level of actions that can be performed by computing device 102. For example, if computer application 110 is unable to restrict or control the ability of computing device 102 to save files to external storage devices, virtual computer application 110 may limit the ability to save files from private network 108 to computing device 102.

In some examples, the one or more policies may limit or otherwise control the ability for computing device 102 to update applications installed at computing device 102 and/or the ability for computing device 102 to install new applications at computing device 102. For example, virtual computer application 110 may maintain a blacklist of applications that cannot be installed at computing device 102 or cannot be updated. In other examples, virtual computer application 110 may maintain a whitelist of applications that can be installed at computing device 102 or can be updated, and applications not on the whitelist cannot be installed at computing device 102 and cannot be updated.

In some examples, the one or more policies may limit or otherwise control the ability for computing device 102 to access certain websites on the internet. For example, virtual computer application 110 may maintain a blacklist of websites that cannot be accessed via computing device 102. In other examples, virtual computer application 110 may maintain a whitelist of websites that can accessed via computing device 102, and websites not on the whitelist cannot be accessed via computing device 102.

In some examples, virtual computer application 110 may determine one or more policies to implement at computing device 102 based at least in part on context information associated with computing device 102. That is, virtual computer application 110 may determine, based at least in part on the current context of computing device 102, one or more actions that computing device 102 is permitted to perform on documents 120 in private network 108. Actions that may be performed on a document may include, for example, opening the document, editing the document, copying the document to computing device 102, copying the document to an external storage device connected to computing device 102, printing the document, and the like. For example, virtual computer application 110 may, at a point in time, determine context information associated computing device 102 at the point in time and may, in response to determining the context information associated computing device 102, determine one or more policies associated with the determined context information associated with computing device 102 to implement at the point in time given the context information associated with computing device 102.

Examples of context information associated with computing device 102 may include the location of computing device 102 (e.g., the country, state, or city where computing device 102 is currently located), the time and/or date at the location of computing device 102, the network connection type of computing device 102 (e.g., whether computing device 102 is connected to the Internet via Wi-Fi or Ethernet, whether computing device 102 is connected to a public Wi-Fi network, etc.), or any other characteristics of computing device 102.

In some examples, context information associated with computing device 102 may also include information associated with the location of computing device 102 provided by one or more third-party service providers. For example, a security services provider may provide information regarding certain locations that are hotspots for malicious computing activity, such as locations with an elevated probability that a malicious actor, such as a hacker, may attempt to hack into computing device 102 and private network 108, and virtual computer application 110 may communicate with such a security services provider via, for example, the internet, to receive such information. In another example, the U.S. government may provide a list of countries (e.g., embargoes and sanctioned countries) in which state-sponsored hackers may attempt to hack into computing device 102 and private network 108. Thus, in some examples, context information associated with computing device 102 may be whether computing device 102 is located in a city or country that is a hotspot for malicious computing activity.

In some examples, context information associated with computing device 102 may also include characteristics of the user of computing device 102, such as whether the user is a manager in the organization or not a manager in the organization, the group in the organization that the user works for, the job title of the user, the location of the user's office in the organization, and the like. Such characteristics of the user may be used to determine the privilege level of the user in private network 108 and to determine the policies that may apply to computing device 102.

In some examples, virtual computer application 110 may, in response to determining context information associated with computing device 102, determine, based on context information associated with computing device 102, one or more policies that are applicable to the context information to implement at computing device 102. Virtual computer application 110 may, for each of the context information associated with computing device 102 (e.g., location, time of day, the network connection type of computing device 102, etc.), determine whether one or more policies are applicable to the context in order to determine one or more policies associated with the contexts. For example, given a location of computing device 102, virtual computer application 110 may determine whether one or more policies apply to the current location of computing device 102 and, in response to determining that one or more policies apply to the current location of computing device 102, implement the one or more policies while computing device 102 is located at the location.

For example, if virtual computer application 110 determines that computing device 102 is located outside of the United States, computing device 102 may, in response, determine whether there are one or more policies that are applicable to the location of computing device 102 being outside of the United States, such as one or more policies that are applicable to computing devices that are in the non-U.S. country where computing device 102 is located. For example, if a policy restricts computing device 102 from printing documents 120 in private network 108 if computing device 102 is outside of the United States, virtual computer application 110 may, in response to determining that computing device 102 is located outside of the United States, computing device 102, apply the policy that restricts computing device 102 from printing documents 120 in private network 108 if computing device 102 is outside of the United States.

In some examples, if virtual computer application 110 accesses policies stored in private network 108, virtual computer application 110 may query private network 108 for one or more policies associated with contextual information by sending an indication of the context information to private network 108. Computing resources in private network 108, such as computing system 104 or edge computing system 106, may receive the indication of the context information and may, in response, determine one or more policies that are applicable to the context information and may send the one or more policies that are applicable to virtual computer application 110. Virtual computer application 110 may, in response to receiving the one or more policies that are applicable to the context information from private network 108, implement the one or more policies received from private network 108 to control the actions that can be performed by computing device 102.

In some examples, virtual computer application 110 may determine one or more policies to implement at computing device 102 to control the actions that can be performed by computing device 102 on a document in private network 108 based at least in part on the contents of the document. Actions that may be performed on a document may include, for example, opening the document, editing the document, copying the document to computing device 102, copying the document to an external storage device connected to computing device 102, printing the document, and the like.

In some examples, computing systems in private network 108, such as computing system 104 or edge computing system 106, may perform a combination of image processing, pattern recognition, natural language processing, and other suitable techniques, such as techniques for text classification, document classification, and the like, using neural networks or any other machine learning techniques (e.g., bag of words, term frequency, inverse document frequency, etc.), to recognize the contents of documents 120 in private network 108 and classify documents 120 in private network 108 based on the contents of the documents 120 in private network 108. In some examples, virtual computer application 110 may perform the above-described machine learning techniques, to recognize the content of documents 120 in private network 108 and classify documents 120 in private network 108 based on the contents of the documents 120 in private network 108.

In some examples, when the user interacts with virtual computer application 110 to open a document in private network 108, virtual computer application 110 may, in response, perform the machine learning techniques described above to classify the contents of the document and may determine, based on the classification of the contents of the document, the actions permitted to be performed on the document by the user at computing device 102. In other examples, virtual computer application 110 may perform the techniques described above to classify the contents of the documents 120 in private network 108 that is not necessarily in response to the user interacts with virtual computer application 110 to open a document in private network 108. In this example, when the user interacts with virtual computer application 110 to open a document in private network 108, virtual computer application 110 may, in response, look up the classification of the document to determine the actions permitted to be performed on the document by the user at computing device 102.

Virtual computer application 110 may recognize the content of documents 120 in private network 108 and classify the documents 120 in private network 108 based on the contents of the documents in many ways. In some examples, private network 108 may, based on the content of the documents, classify the documents based on security level, such as into high security, medium security, and low security categories, where documents categorized as high security may be highly sensitive or confidential, documents categorized as medium security may be somewhat sensitive or confidential, and documents categorized as low security may not be sensitive or confidential.

In some examples, private network 108 may, based on the content of the documents, determine a classification of the documents by classifying the documents into different categories of work product for the organization. For example, if the organization is a patent law firm, virtual computer application 110 may be able to recognize the contents of the documents and be able to identify whether the document is a draft patent application, a draft Office Action response, an invention disclosure received from a client, notes taken by an attorney, a draft non-infringement opinion, and the like. Similarly, if the organization is a patent law firm, virtual computer application 110 may be able to recognize the contents of the documents and be able to identify the client associated with the document, the lawyer associated with the document, the technologies associated with the document, and the like.

In some examples, private network 108 may classify a document in private network 108 based at least in part on the content of the document in response to the user of computing device 102 attempting to open the document. That is, virtual computer application 110 may, in response to receiving a request to perform an action to open a document in private network 108, such as by receiving a user input that corresponds with opening the document, perform content recognition of the document to classify the document. Virtual computer application 110 may, in response to classifying the document, determine one or more policies that are applicable to the document based on the classification of the document. Virtual computer application 110 may therefore determine, based on the one or more policies, the one or more actions that may be performed by computing device 102, such as whether computing device 102 is allowed to open the document, whether computing device 102 is allowed to edit the document, whether computing device 102 is allowed to print the document, and the like.

In some examples, virtual computer application 110 may be able to determine one or more policies that control the actions permitted to be performed on a document based on both context information associated with computing device 102 and the contents of the document. In some examples, virtual computer application 110 may, for each of the context information associated with computing device 102 (e.g., location, time of day, the network connection type of computing device 102, etc.), determine whether one or more policies are applicable to the context to determine one or more policies that are applicable to the context information associated with computing device 102. Virtual computer application 110 may, in response to determining the one or more policies that are applicable to the context information associated with computing device 102, determine whether each of the one or more policies applicable to the context information associated with computing device 102 are also applicable to the document based on the contents of the document. Virtual computer application 110 may, in response to determining one or more policies that are applicable to both the context information associated with computing device 102 and the contents of the document, apply the one or more policies to determine whether to allow an action to be performed on the document.

For example, if computing device 102 is located in a particular country, virtual computer application 110 may, based on the location of computing device 102, determine one or more policies that apply when computing device 102 is located in the particular country. For example, if computing device 102 is located in a country that is a hotspot for malicious computing activity, such as determined from information received by virtual computer application 110 from a third-party security services provider, virtual computer application 110 may determine one or more policies that apply when computing device 102 is located in a country that is a hotspot for malicious computing activity.

The one or more policies that apply when computing device 102 is located in a country that is a hotspot for malicious computing activity may include a policy that specifies the actions that can be performed on a document based on the contents of the document. In some examples, virtual computer application 110 may perform content recognition of the contents of the document to classify the document, using the techniques described above, in response to receiving a request to open the document. In some examples, in response to receiving a request to open the document, virtual computer application 110 may query private network 108 for the classification of the document and may, in response, receive an indication of the classification of the document. In other examples, in response to receiving a request to open the document, virtual computer application 110 may perform content recognition to classify the document on computing device 102.

For example, a policy applicable to the location of computing device 102 may specify that a patent application in private network 108 can be opened while located at a country that is a hotspot for malicious computing activity but cannot be edited, saved to computing device 102 or an external storage device, and cannot be printed. Thus, if virtual computer application 110 determines that the document is classified as a patent application based on the content of the document, then virtual computer application 110 may implement the policy to allow the user to open the document but not to save or print the document.

In another example, if computing device 102 that is attempting to perform an action is located outside of the United States at a particular time of the day, virtual computer application 110 may determine one or more policies that virtual computer application 110 may implement based on the location of computing device 102, the time of day, and the content of the document. For example, virtual computer application 110 may apply a policy that prevents highly sensitive documents from being opened when computing device 102 is located outside of the United States and when the time of day is outside of normal working hours (e.g., 9 am to 6 pm) in the United States. In this example, if virtual computer application 110 receives a request at computing device 102 to open a document in private network 108, virtual computer application 110 may, in response to determining that computing device 102 is outside of the United States and that the current time of day is outside of normal working hours in the United States, determine whether the document is classified as highly sensitive based on the contents of the document. If virtual computer application 110 determines that the document is classified as highly sensitive, virtual computer application 110 may prevent the document from being opened at computing device 102.

In some examples, virtual computer application 110 may determine whether to perform a processing task at computing device 102 or to offload performance of the processing task to computing resources in the private network 108 based in part on at least one of: an amount of processing resources available at computing device 102 or network conditions of the secure communications channel between computing device 102 and private network 108. In some examples, if virtual computer application 110 determines that a processing task is consuming a large amount of processing resources, such as more than 30% of the processing resources, more than 50% of the processing resources, and the like, virtual computer application 110 may offload the processing task to private network 108.

In some examples, virtual computer application 110 may determine whether to allocate processing tasks between computing device 102 and the computing resources (e.g., edge computing system 106) in the private network 108 based on network conditions. In some examples, processing tasks that are highly complex (e.g., consume a large amount of processing resources), such as rendering a complex three dimensional holographic user interface as the virtual desktop, may also require good network conditions (e.g., low latency and a large amount of bandwidth) in order to provide a good experience to users using the three dimensional holographic user interface. Thus, in some examples, virtual computer application 110 may only offload tasks that require good network conditions to the computing resources in private network 108 in response to determining that the network conditions of the secure communication channel between computing device 102 and private network 108 is good enough to handle such tasks.

For example, virtual computer application 110 may periodically test the network conditions, such as the transfer speed, latency, or any other network metrics, of the secure communication channel between computing device 102 and private network 108, such as by periodically pinging edge computing system 106 or by periodically running any suitable network tests between computing device 102 and private network 108. Virtual computer application 110 may determine that the network metrics of the secure communication channel are acceptable if, for example, the transfer speed of the secure communication channel is above a threshold transfer speed and if, for example, the latency of the secure communication channel is below a threshold latency. If virtual computer application 110 determines that the network metrics of the secure communication channel are acceptable for offloading a processing task, virtual computer application may offload the processing task to the computer resources of private network 108.

The offloading of processing tasks to computing resources in private network 8 may be dynamic and may change based on changing conditions in, for example, the processor usage of computing device 102 and the network conditions in the secure communication channel between computing device 102 and private network 108. For example, as virtual computer application 110 periodically monitors the network conditions of the secure communications channel between computing device 102 and private network 108, virtual computer application 110 may determine that the latency of the secure communications channel is above a threshold latency and/or that the transfer speed of the secure communications channel is below a threshold transfer speed, and therefore the network conditions are no longer good enough for an offloaded task that requires good network conditions.

In this example, virtual computer application 110 may, in response to determining that the network conditions are no longer good enough for an offloaded processing task that requires good network conditions, restart performing the offloaded processing task at the computer device 102 and may, instead, offload a processing task to private network 108 that is less sensitive to the network conditions of the secure communications channel between computing device 102 and private network 108. For example, virtual computer application 110 may restart processing a three dimensional holographic user interface at computing device 102 but may, instead, offload a processing task that is less sensitive to the network conditions to private network 108.

In another example, if virtual computer application 110 determines that computing device 102 has sufficient unused processing resources (e.g., processor cycles) to perform a previously-offloaded processing task, virtual computer application 110 may restart performing the offloaded processing task at computer device 102. For example, if virtual computer application 110 determines that the offloaded processing task of rendering the three dimensional holographic user interface requires 50% of the processing resources of computing device 102, virtual computer application 110 may, in response to determining that more than 50% of the processing resources of computing device 102 is unused, restart processing the three dimensional holographic user interface at computing device 102.

Figure 2:
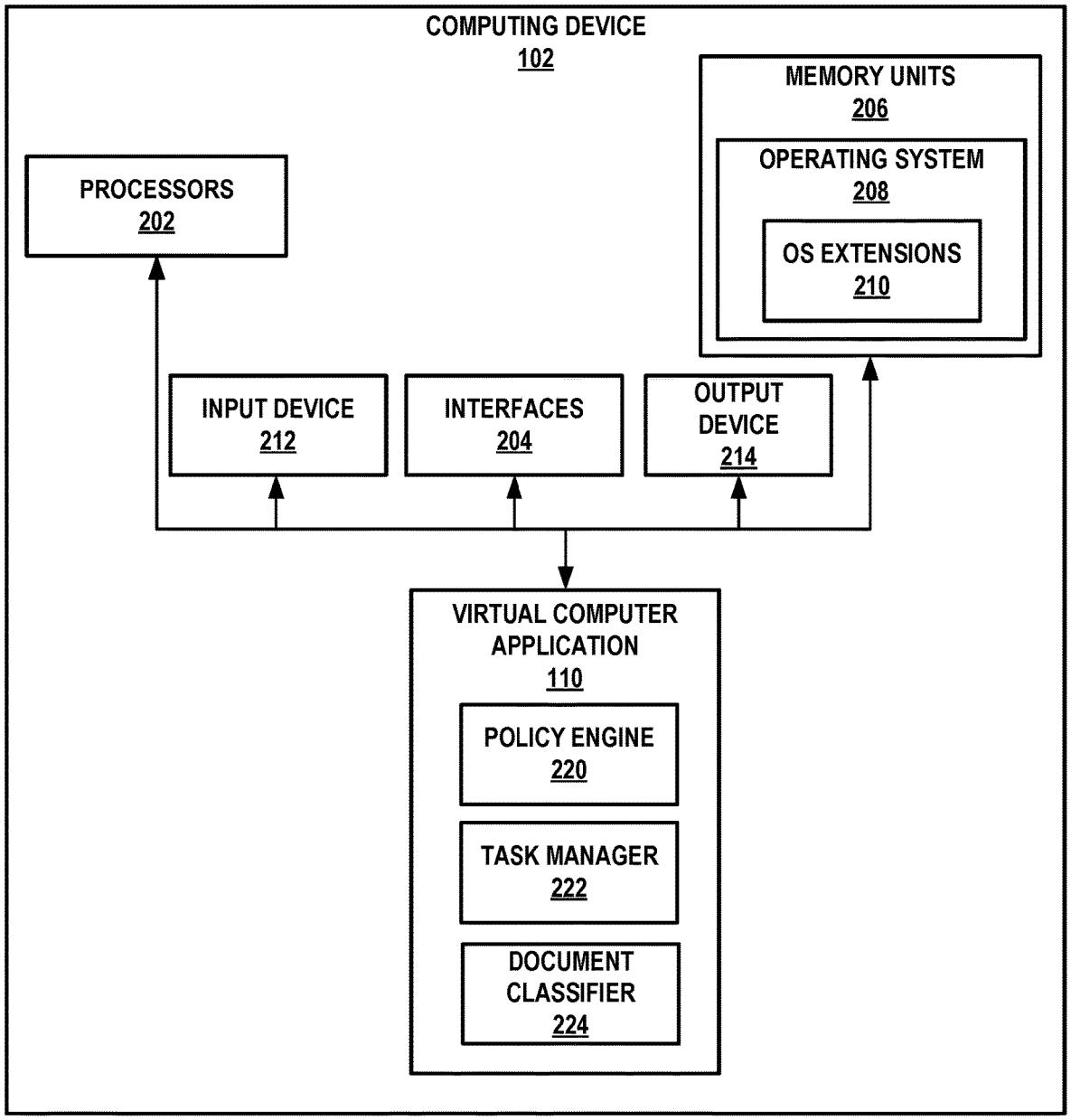
FIG. 2 is a block diagram illustrating an example computing device of FIG. 1 that includes virtual computer application, in accordance with the techniques of this disclosure.

FIG. 2 is a block diagram illustrating an example computing device 102 of FIG. 1 that includes virtual computer application 110 in accordance with the techniques of this disclosure. The architecture of computing device 102 illustrated in FIG. 2 is shown for exemplary purposes only. Computing device 102 should not be limited to the illustrated example architecture. In other examples, computing device 102 may be configured in a variety of ways. For instance, although computing device 102 is illustrated in a single computing device in the example of FIG. 2, in other examples, functional units may be executed on a centralized or distributed network of computing devices.

As shown in the example of FIG. 2, computing device 102 includes one or more processors 202, one or more interfaces 204, one or more memory units 206, input device 212, and output device 214. Computing device 102 also includes virtual computer application 110, which may be implemented as program instructions and/or data stored in memory units 206 and executable by processors 202 or implemented as one or more hardware units or devices of computing device 102. Memory units 206 of computing device 102 may also store operating system 208 executable by processors 202 to control the operation of components of computing device 102. The components, units or modules of computing device 102 are coupled (physically, communicatively, and/or operatively) using communication channels for inter-component communications. In some examples, the communication channels may include a system bus, a network connection, an inter-process communication data structure, or any other method for communicating data.

Processors 202, in one example, may comprise one or more processors that are configured to implement functionality and/or process instructions for execution within computing device 102. For example, processors 202 may be capable of processing instructions stored by memory units 206. Processors 202 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory units 206 may be configured to store information within computing device 30 during operation. Memory units 206 may include a computer-readable storage medium or computer-readable storage device. In some examples, memory units 206 include one or more of a short-term memory or a long-term memory. Memory units 36 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory units 206 are used to store program instructions for execution by processors 202. Memory units 206 may be used by software or applications running on computing device 102 (e.g., virtual computer application 110) to temporarily store information during program execution.

Input device 212 of computing device 102 may be configured to receive input, such as from users of computing device 102. Examples of input are tactile, audio, and video input. Input device 212 of computing device 102, in one example, includes a presence-sensitive display, touch-sensitive screen, mouse, keyboard, voice responsive system, video camera, microphone or any other type of device for detecting input from a human or machine.

Output device 214 of computing device 102 may be configured to generate output. Examples of output are tactile, audio, and video output. Output device 214 of computing device 102, in one example, includes a presence-sensitive display, sound card, video graphics adapter card, speaker, cathode ray tube (CRT) monitor, liquid crystal display (LCD), or any other type of device for generating output to a human or machine.

Computing device 102 may utilize interfaces 204 to communicate with external devices via one or more networks. Interfaces 204 may be network interfaces, such as Ethernet interfaces, optical transceivers, radio frequency (RF) transceivers, or any other type of devices that can send and receive information. Other examples of such network interfaces may include Wi-Fi or Bluetooth radios. In some examples, computing device 102 utilizes interfaces 204 to wirelessly communicate with external devices. For example, interfaces 204 may include a WiFi radio, a cellular radio, and the like so what computing device 102 may connect to and communicate with external computing devices over WiFi and may also connect to and communicate with external computing devices by connecting to a cellular data network (e.g., a 5G network).

According to the disclosed techniques, processors 202 may execute virtual computer application 110 to connect to private network 108 to access resources in private network 108. Virtual computer application 110 may provide functionality such as VPN functionality, remote desktop functionality, and the like that enables users of computing device 102 to access resources in private network 108 as though computing device 102 is situated within private network 108, such as by enabling users of computing device 102 to open, edit, save, and/or print documents 120 in private network 108.

In order to gain access to private network 108, virtual computer application 110 may execute to authenticate with private network 108 based on the user credentials of the user at computing device 102. For example, virtual computer application 110 may receive the user credentials of the user, such as the username and password of the user, by receiving, at input device 212, user input that corresponds to the user credentials of the user. For example, a user may interact with input device 212, such as by typing on a keyboard provided by input device 212, to provide user input that corresponds to the username and password of the user. In some examples, computing device 102 may be operably coupled to peripherals or other endpoint devices and may receive an indication of the user credentials of the user from the peripherals or other endpoint devices that are connected to computing device 102. Virtual computer application 110 may therefore send the user credentials to private network 108 in order to authenticate with private network 108.

Virtual computer application 110 may, in response to authenticating with private network 108, establish, via interfaces 204, a secure communication channel with private network 108. The secure communication channel may be in the form of a VPN or any other encrypted communication channel that enables computing device 102 to securely communicate with computing resources of private network 108, such as computing system 104 and/or edge computing system 106, over a network such as the internet.

When virtual computer application 110 may, in response to establishing a secure communication channel with private network 108, provide virtual desktop functionality with which the user may interact to access resources in private network 108. For example, virtual computer application 110 may provide a virtual desktop in the form of a graphical user interface that presents desktop computing user interfaces familiar to the user of computing device 102, such as desktop computing user interfaces of Microsoft Windows or Apple macOS desktop operating systems, with which a user may interact to browse private network 108 and to access resources in private network 108. In the examples where computing device 102 is a mobile computing device, computing device 102 may be connected to peripherals such as a monitor, a keyboard, a mouse, and the like, and virtual computer application 110 may output the virtual desktop for display at the monitor connected to computing device 102.

In some examples, computing resources in private network 108, such as computing system 104 and edge computing system 106 may perform rendering of the virtual desktop presented by virtual computer application 110 and may send the rendered virtual desktop to computing device 102 for virtual computer application 110 to present and output at computing device 102 (e.g., display at output device 214). In some examples, virtual computer application 110 may perform rendering of the virtual desktop at computing device 102 and may output the rendered virtual desktop at computing device 102 (e.g., display at output device 214).

In some examples, virtual computer application 110 may include task manager 222 that may dynamically allocate processing tasks between computing device 102 and computing resources (e.g., computing system 104 and edge computing system 106) in private network 108 by determining, based at least in part on network conditions and/or processor usage at computing device 102, whether to perform processing tasks, such as rendering a virtual desktop, on computing device 102 or to offload performance of processing tasks to computing resources in private network 108. Task manager 222 of virtual computer application 110 may continuously monitor the utilization of processors 202, the utilization of memory units 206, network conditions of the secure communication channel between computing device 102 and private network 108, and the like and may determine how to dynamically allocate processing tasks between computing device 102 and computing resources in private network 108 based on one or more of the utilization of processors 202, the utilization of memory units 206, and network conditions of the secure communication channel between computing device 102 and private network 108.

In some example, task manager 222 may, in response to determining that the overall utilization of processors 202 is above a specified threshold, such as by being above a threshold percentage of utilization, task manager 222 may determine to offload one or more processing tasks to being processed by the computing resources in private network 108. For example, task manager 222 may select a processing task that has the highest utilization of processors 202 out of the processing tasks being processed by processors 202 as the processing task to offload to the computing resources in private network 108.

In some examples, task manager 222 may select one or more processing tasks to be offloaded to the computing resources in private network 108 based at least in part on the network conditions. For example, certain processing tasks, such as processing tasks for rendering a virtual desktop, may require low latency in the secure communication channel between computing device 102 and private network 108 in order to be responsive to user interactions with the virtual desktop. As such, if a potential processing task to be offloaded requires certain network conditions, such as at least a certain amount of bandwidth and/or no more than a certain amount of latency, task manager 222 may determine, based on the network conditions of the secure communication channel between computing device 102 and private network 108, determine whether such a network conditions-sensitive processing task can be offloaded to private network 108.

If task manager 222 determines, for a network conditions-sensitive processing task, that the network conditions of the secure communication channel between computing device 102 and private network 108 meet the network conditions requirement of the network conditions-sensitive processing task, then task manager 22 may offload the processing task to the computing resources in private network 108, such as to edge computing system 106. Conversely, if task manager 222 determines, for a network conditions-sensitive processing task, that the network conditions of the secure communication channel between computing device 102 and private network 108 does not meet the network conditions requirement of the network conditions-sensitive processing task, then task manager 22 may offload a different processing task to the computing resources in private network 108.

As the utilization of processors 202, the utilization of memory units 206, and/or the network conditions of the secure communication channel between computing device 102 and private network 108 change, task manager 22 may dynamically reallocate processing tasks between computing device 102 and private network 108. For example, if task manager 222 determines that the network conditions of the secure communication channel between computing device 102 and private network 108 no longer meets the network conditions requirement of a network conditions-sensitive processing task offloaded for processing at private network

108, task manager 222 may onboard such a offloaded processing task back to being performed by processors 202 of computing device 102. Instead, task manager 22 may offload a different processing task to the computing resources in private network 108. In another example, if task manager 222 determines that the overall utilization of processors 202 would not rise above a specified threshold if a previously offloaded processing task is onboarded back to computing device 102 for processing at private network 108, task manager 222 may onboard such a offloaded processing task back to being performed by processors 202 of computing device 102.

In some examples, when task manager 222 dynamically allocates processing tasks between computing device 102 and computing resources in private network 108, task manager 222 may select specific computing resources in private network 108 for processing a processing task offloaded from computing device 102. For example, the computing resources private network 108 as shown in FIG. 1 may include computing system 104 as well as edge computing system 106 in edge computing network 112. In some examples, because edge computing system 106 is located in edge computing network 112 that is physically closer to computing device 102 compared with computing system 104, the communication channel between compute device 102 and edge computing system 106 may experience lower latency and potentially higher bandwidth compared to the communication channel between compute device 102 and computing system 104. On the other hand, computing system 104 may have more processing power that can handle the processing more complex processing tasks and can process processing tasks more quickly compared with edge computing system 106.

Thus, when task manager 222 determines whether to offload a processing task to the computing resources in private network 108, task manager 22 may select a computing resource to which the processing task is offloaded based at least in part on processor utilization of the processing task and on the level of sensitivity the processing task is to network conditions. For example, if task manager 222 determines that a processing task has a high level of sensitivity, such as by requiring a low level of latency in the network, task manager 222 may offload the processing task to a computing resource in private network 108 that meets the network conditions required by the processing task, such as by offloading the processing task to edge computing system 106. In another example, if task manager 222 determines that a processing task has a high level of processor utilization, task manager 222 may offload the processing task to a computing resource in private network 108 that meets the processor utilization requirements of the processing task, such as by offloading the processing task to computing system 104.

Virtual computer application 110 may be able to control the use of and/or functionality of peripherals connected to computing device 102, such as printers, microphones, cameras, flash drives, external hard drives, as well as the ability of computing device 102 to use peripherals connected to computing device 102. In some examples, virtual computer application 110 may restrict or control the ability of computing device 102 to print to a printer connected to computing device 102. In some examples, virtual computer application 110 may prevent computing device 102 from printing documents 120 in private network 108 to a printer connected to or accessible to computing device 102, or may prevent computing device 102 from printing any documents to a printer connected to or accessible to computing device 102.

In some examples, virtual computer application 110 may restrict or control the ability of computing device 102 to save files to external storage devices, such as flash drives, external hard drives, network attached storage devices, and the like, connected to computing device 102. In some examples, virtual computer application 110 may prevent computing device 102 from saving documents 120 in private network 108 to an external storage device connected to or accessible to computing device 102, or may prevent computing device 102 from storing any documents, such as any documents stored in computing device 102, to an external storage device connected to or accessible to computing device 102.

In some examples, to control the operating system-level functionality of computing device 102, such as to control the ability of computing device 102 to print documents to a printer and the ability of computing device 102 to save documents to an external storage device, operating system extensions 210 can be installed in operating system 208, and virtual computer application 110 may interact or otherwise communicate with operating system extensions to control the operating system-level functionality of computing device 102. For example, operating system extensions 210 may be loadable kernel modules, kernel extensions, kernel-mode drivers, and the like associated with virtual computer application 110 that are installed in in the operating system 208 to control the use of and/or functionality of peripherals connected to computing device 102, such as the ability for computing device 102 to save files to external storage devices connected to computing device 102 or the ability for computing device 102 to print to a printer connected to computing device 102, virtual computing 110 may determine that virtual computer application 110 is able to control the operating system-level functionalities of computing device 102.

In some examples, operating system extensions 210 may control the ability for computing device 102 to update applications installed at computing device 102 and/or the ability for computing device 102 to install new applications at computing device 102. For example, operating system extension 210 may allow computing device 102 to only be able to install and upgrade applications in a whitelist of application maintained by operating system extension 210, or may prevent computing device 102 from installing and upgrading applications in a blacklist of applications maintained by operating system extension 210.

In some examples, operating system extensions 210 may control the ability for computing device 102 to access certain websites or other network resources. For example, operating system extension 210 may allow computing device 102 to only be able access websites in a whitelist of websites maintained by operating system extension 210, or may prevent computing device 102 accessing websites in a blacklist of websites maintained by operating system extension 210.

In some examples, if virtual computer application 110 determines that operating system extensions 210 for controlling the operating system-level functionality of computing device 102 are not installed in operating system 208, virtual computer application 110 may reduce the level of actions that can be performed by computing device 102. For example, if computer application 110 is unable to restrict or control the ability of computing device 102 to save files to external storage devices, virtual computer application 110 may limit the ability to save files from private network 108 to computing device 102. In another example, if computer application 110 is unable to restrict or control the ability of computing device 102 to recognize and use a printer connected to computing device 102, virtual computer application 110 may not allow computing device 102 to open documents 120 in private network 108.

In some examples, the ability of computing device 102 to perform one or more actions on documents 120 in private network 108 may be governed by one or more policies. To that end, virtual computer application 110 includes policy engine 220 that manages and enforces one or more policies that specify and control the actions that can be performed by computing device 102, such as actions that can be performed by computing device 102 on documents in private network 108. For example, a policy may specify whether computing device 102 is allowed to open documents 120 in private network 108, edit documents 120 in private network 108, save documents from private network 108 to computing device 102, save documents from private network 108 to an external storage device connected to computing device 102, and the like.

Policy engine 220 of virtual computer application 110 may determine one or more policies that are applicable to computing device 102 based at least in part on context information associated with computing device 102. Examples of contexts may include the location of computing device 102, the time and/or date at the location of computing device 102, the network connection type of computing device 102 (e.g., whether computing device 102 is connected to the Internet via Wi-Fi or Ethernet, whether computing device 102 is connected to a public Wi-Fi network, etc.), or any other characteristics of computing device 102.

In some examples, context information associated with computing device 102 may also include information associated with the location of the computing device provided by one or more third-party service providers. For example, a security services provider may provide information regarding certain locations that are hotspots for malicious computing activity, such as locations with an elevated probability that a malicious actor, such as a hacker, may attempt to hack into computing device 102 and private network 108, and virtual computer application 110 may communicate with such a security services provider via, for example, the internet, to receive such information. In another example, the U.S. government may provide a list of countries (e.g., embargoes and sanctioned countries) in which state-sponsored hackers may attempt to hack into computing device 102 and private network 108. Thus, in some examples, context information associated with computing device 102 may be whether computing device 102 is located in a city or country that is a hotspot for malicious computing activity.

In some examples, context information associated with computing device 102 may also include characteristics of the user of computing device 102, such as whether the user is a manager in the organization or not a manager in the organization, the group in the organization that the user works for, the job title of the user, the location of the user's office in the organization, and the like. Such characteristics of the user may be used to determine the privilege level of the user in private network 108 and to determine the policies that may apply to computing device 102.

Policy engine 220 may determine the context information associated with computing device 102 by communicating with processors 202, input device 212, output device 214, interfaces 204, and operating system 208, as well as by communicating with one or more third-party service providers via interfaces 204, to receive various information such as the current location of computing device 102, the time of day, the user currently using computing device 102, information regarding malicious hackers at the location of computing device 102, the type of network to which computing device 102 is connected, and the like, to derive the context information associated with computing device 102. Policy engine 220 may, in response to determining context information associated with computing device 102, determine, based on context information associated with computing device 102, one or more policies that are applicable to the context information to implement at computing device 102.

In some examples, virtual computer application 110 may include a set of policies, and policy engine 220 may, for each policy in the set of policies, determine whether the policy is applicable to a context of the context information associated with computing device 102. For example, each policy in the policy may specify context information to which the policy is applicable, and policy engine 220 may determine one or more policies from the set of policies that are applicable to the context information associated with computing device 102. For example, if the context information associated with computing device 102 includes computing device 102 being currently located in France, policy engine 220 may determine that a policy is applicable to the context of computing device 102 being located in France if the policy is applicable to the computing device 102 being located outside the United States, if the policy is applicable to the computing device 102 being located in Europe, or if the policy is applicable to the computing device 102 being located in France.

In some examples, the policies are not stored in computing device 102 but are instead stored in a computing system external to computing device 102, such as being stored in private network 108. To determine one or more policies that are applicable to context information associated with computing device 102, policy engine 220 may send an indication of the context information associated with computing device 102 to private network 108 (e.g., edge computing system 106). Private network 108 may receive the indication of the context information associated with computing device 102 and may, in response determine one or more policies that are applicable to the context information associated with computing device 102. Private network 108 may therefore send an indication of the one or more policies that are applicable to the context information associated with computing device 102 to computing device 102. Computing device 102 may receive, from private network 108, the one or more policies that are applicable to the context information associated with computing device 102 and may, in response, apply the one or more policies.

In some examples, policy engine 220 may determine one or more policies that are applicable to the context information associated with computing device 102 in response to receiving a request from computing device 102 to perform an action on a document in private network 108. For example, policy engine 220 may, in response to virtual computer application receiving user input to request to open a document in private network 108, such as receiving user input to browse a directory structure in private network 108 to the document and receiving user input double clicking on the document, determine context information associated with computing device 102 and determine one or more policies that are applicable to the context information.

Policy engine 220 may, in response to determining the one or more policies, apply the one or more policies to determine whether the action. For example, if the one or more policies allow the document to be opened by computing device 102 but does not allow the document to be printed or saved, policy engine 220 may enforce the one or more policies to enable computing device 102 to open the document but may prevent computing device 102 from saving the document and printing the document.

In some examples, in addition to determining one or more policies that are applicable to context information associated with computing device 102, virtual computer application 110 may determine one or more policies that are applicable to context information associated with computing device 102 and to the contents of a document to control the actions permitted to be performed by a user using computing device 102 on the document in private network 108. Actions that may be performed on a document may include, for example, opening the document, editing the document, copying the document to computing device 102, copying the document to an external storage device connected to computing device 102, printing the document, and the like.

In some examples, computing systems in or associated with private network 108, such as computing system 104 or edge computing system 106, may perform a combination of image processing, pattern recognition, natural language processing, and other suitable techniques, such as techniques for text classification, document classification, and the like, using neural networks or any other machine learning techniques (e.g., bag of words, term frequency, inverse document frequency, etc.), to recognize the contents of documents 120 in private network 108 and classify documents 120 in private network 108 based on the contents of the documents 120 in private network 108. In some examples, document classifier 224 of virtual computer application 110 may perform the above-described machine learning techniques, to recognize the content of documents 120 in private network 108 classify documents 120 in private network 108 based on the contents of the documents 120 in private network 108.

In some examples, when the user interacts with virtual computer application 110 to attempt to open a document in private network 108, document classifier 224 of virtual computer application 110 may, in response, perform the machine learning techniques described above to classify the contents of the document. Policy engine 220 may, in response to determining the classification of the contents of the document, determine one or more policies that apply to the context information associated with computing device 102 and the classification of the contents of the document, and virtual computer application 110 may, in response, determine the actions permitted to be performed by a user using computing device 102 on the document, such as whether the document can be opened, saved, printed, and the like.

In some examples, virtual computer application 110 may determine one or more policies to implement for a document in private network 108 based at least in part on context information associated with computing device 102 and the contents of the document. For example, policy engine 220 may determine context information associated with computing device 102, such as the location of computing device 102 and may determine one or more policies that are applicable to the context information associated with computing device 102. Policy engine 220 may determine, out of the one or more policies applicable to the context information associated with computing device 102, one or more policies that are also applicable to a classification of the document. For example, document classifier 224 may classify the document based on the content of the document, and policy engine 220 may determine, out of the one or more policies applicable to the context information associated with computing device 102, one or more policies that are also applicable to the classification of the document determined by document classifier 224. Virtual computer application 110 may therefore implement the one or more policies that are applicable to both the context information associated with computing device 102 and the classification of the document to control the actions that may be performed by computing device 102 on the document.

Figure 3:
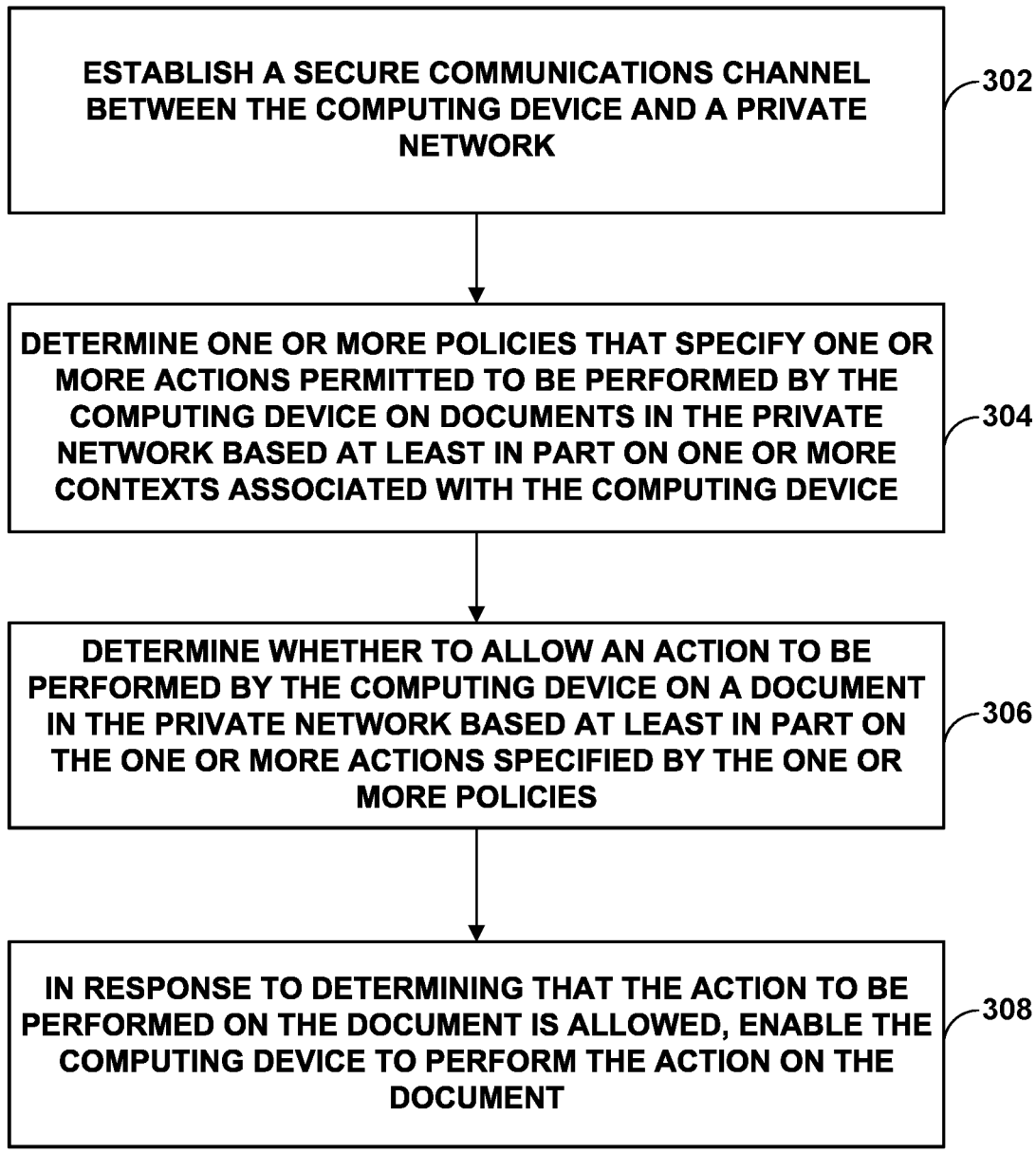
FIG. 3 is a flowchart illustrating operations of a virtual computer application that implements policies at a computing device that controls the computing device's access to an organization's private computer network, in accordance with aspects of the present disclosure.

FIG. 3 is a flowchart illustrating operations of a computing device of a virtual computer application that implements policies at a computing device that controls the computing device's access to an organization's private computer network, in accordance with aspects of the present disclosure. FIG. 3 is described with respect to computing device 102 of FIG. 1.

As shown in FIG. 3, virtual computer application 110 executing at computing device 102 may establish a secure communications channel between the computing device 102 and a private network 108 (302). Virtual computer application 110 may determine one or more policies that specify one or more actions permitted to be performed by the computing device on documents 120 in the private network 108 based at least in part on context information associated with the computing device 102 (304). Virtual computer application 110 may determine whether to allow an action to be performed by the computing device on a document in the private network 108 based at least in part on the one or more actions specified by the one or more policies (306). Virtual computer application 110 may, in response to determining that the action to be performed on the document is allowed, enable the computing device 102 to perform the action on the document (308).

In some examples, to determine the one or more policies applicable to the context information associated with the computing device 102, virtual computer application 110 may send, to the private network 108, an indication of the context information associated with the computing device 102 and, in response to sending the indication of the context information associated with the computing device 102, receive, from the private network 108, the one or more policies that are applicable to the context information associated with the computing device 102. In some examples, the context information associated with the computing device 102 comprises one or more of: a location of the computing device 102, a time of day at the location of the computing device 102, a privilege level of a user of the computing device 102, or information associated with the location of the computing device 102 provided by one or more third-party service providers.

In some examples, to determine the one or more policies that specify the one or more actions permitted to be performed by the computing device 102 on the documents 120 in the private network 108 based at least in part on the context information associated with the computing device 102, virtual computer application 110 may determine the one or more policies that specify the one or more actions permitted to be performed by the computing device 102 on the document in the private network 108 based at least in part on the context information associated with the computing device 102 and contents of the document.

In some examples, to determine the one or more policies that specify the one or more actions permitted to be performed by the computing device 102 on the document in the private network 108 based at least in part on the context information associated with the computing device 102 and the contents of the document, the virtual computer application may determine, based at least in part on the contents of the document, a classification of the document and may determine the one or more policies that specify the one or more actions permitted to be performed by the computing device 102 on the document in the private network 108 based at least in part on the context information associated with the computing device 102 and the classification of the document. In some examples, to determine the classification of the document, the virtual computer application 110 may determine, based at least in part on the contents of the document, the classification of the document using one or more machine learning techniques. In some examples, virtual computer application 110 may determine the one or more policies that specify the one or more actions permitted to be performed by the computing device 102 on the document in the private network 108 based at least in part on the context information associated with the computing device 102 and the classification of the document in response to the virtual computer application 110 receiving a request from the computer device 102 to open the document.

In some examples, virtual computer application 110 may further determine whether the virtual computer application 110 is able to control operating system-level functionalities of the computing device 102 and may, in response to determining that the virtual computer application 110 is not able to control the operating system-level functionalities of the computing device 102, reduce a level of actions that can be performed by the computing device 102 on documents 120 in the private network 108.

In some examples, the action to be performed by the computing device 102 comprises one of: opening the document at the computing device 102, saving the document to the computing device 102, saving the document to an external storage device connected to the computing device 102, or printing the document.

In some examples, virtual computer application 110 may determine, based in part on at least one of: an amount of processing resources available at the computing device 102 or network conditions of the secure communications channel between the computing device 102 and the private network 108, whether to perform a processing task at the computing device 102 or to offload performance of the processing task to computing resources in the private network 108.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
    establishing, by a virtual computer application at a computing device, a secure communications channel between the computing device and a private network;
    determining, by the virtual computer application, one or more policies that specify one or more actions permitted to be performed by the computing device on documents in the private network based at least in part on context information associated with the computing device;

determining, by the virtual computer application, whether the virtual computer application is able to control operating system-level functionalities of the computing device;

in response to determining that the virtual computer application is not able to control the operating system-level functionalities of the computing device, reducing, by the virtual computer application, a level of actions that can be performed by the computing device on documents in the private network;

determining, by the virtual computer application, whether to allow an action to be performed by the computing device on a document in the private network based at least in part on the one or more actions specified by the one or more policies; and in response to determining that the action to be performed on the document is allowed, enabling, by the virtual computer application, the computing device to perform the action on the document.

2. The method of claim 1, wherein determining the one or more policies applicable to the context information associated with the computing device, further comprises:

sending, by the virtual computer application to the private network, an indication of the context information associated with the computing device; and in response to sending the indication of the context information associated with the computing device, receiving, by the virtual computer application from the private network, the one or more policies that are applicable to the context information associated with the computing device.

3. The method of claim 1, wherein the context information associated with the computing device comprises one or more of: a location of the computing device, a time of day at the location of the computing device, a privilege level of a user of the computing device, or information associated with the location of the computing device provided by one or more third-party service providers.

4. The method of claim 1, wherein determining the one or more policies that specify the one or more actions permitted to be performed by the computing device on the documents in the private network based at least in part on the context information associated with the computing device further comprises:

determining, by the virtual computer application, the one or more policies that specify the one or more actions permitted to be performed by the computing device on the document in the private network based at least in part on the context information associated with the computing device and contents of the document.

5. The method of claim 4, wherein determining the one or more policies that specify the one or more actions permitted to be performed by the computing device on the document in the private network based at least in part on the context information associated with the computing device and the contents of the document further comprises:

determining, by the virtual computer application and based at least in part on the contents of the document, a classification of the document; and determining, by the virtual computer application, the one or more policies that specify the one or more actions permitted to be performed by the computing device on the document in the private network based at least in part on the context information associated with the computing device and the classification of the document.

6. The method of claim 5, wherein determining the classification of the document further comprises:

determining, by the virtual computer application and based at least in part on the contents of the document, the classification of the document using one or more machine learning techniques.

7. The method of claim 5, wherein determining the one or more policies that specify the one or more actions permitted to be performed by the computing device on the document in the private network based at least in part on the context information associated with the computing device and the classification of the document is in response to the virtual computer application receiving a request from the computer device to open the document.

8. The method of claim 1, wherein the action to be performed by the computing device comprises one of: opening the document at the computing device, saving the document to the computing device, saving the document to an external storage device connected to the computing device, or printing the document.

9. The method of claim 1, further comprising:

determining, by the virtual computer application and based in part on at least one of: an amount of processing resources available at the computing device or network conditions of the secure communications channel between the computing device and the private network, whether to perform a processing task at the computing device or to offload performance of the processing task to computing resources in the private network.

10. A computing device comprising:

memory configured to store a virtual computer application;

one or more processors in communication with the memory and configured to execute the virtual computer application to:

establish a secure communications channel between the computing device and a private network;

determine one or more policies that specify one or more actions permitted to be performed by the computing device on documents in the private network based at least in part on context information associated with the computing device;

determine whether the virtual computer application is able to control operating system-level functionalities of the computing device;

in response to determining that the virtual computer application is not able to control the operating system-level functionalities of the computing device, reduce a level of actions that can be performed by the computing device on documents in the private network;

determine whether to allow an action to be performed by the computing device on a document in the private network based at least in part on the one or more actions specified by the one or more policies; and in response to determining that the action to be performed on the document is allowed, enable the computing device to perform the action on the document.

11. The computing device of claim 10, wherein to determine the one or more policies applicable to the context information associated with the computing device, the one or more processors are further configured to execute the virtual computer application to:

send, to the private network, an indication of the context information associated with the computing device; and in response to sending the indication of the context information associated with the computing device, receive, from the private network, the one or more policies that are applicable to the context information associated with the computing device.

12. The computing device of claim 10, wherein the context information associated with the computing device comprises one or more of: a location of the computing device, a time of day at the location of the computing device, a privilege level of a user of the computing device, or information associated with the location of the computing device provided by one or more third-party service providers.

13. The computing device of claim 10, wherein to determine the one or more policies that specify the one or more actions permitted to be performed by the computing device on the documents in the private network based at least in part on the context information associated with the computing device, the one or more processors are further configured to execute the virtual computer application to:

determine the one or more policies that specify the one or more actions permitted to be performed by the computing device on the document in the private network based at least in part on the context information associated with the computing device and contents of the document.

14. The computing device of claim 13, wherein to determine the one or more policies that specify the one or more actions permitted to be performed by the computing device on the document in the private network based at least in part on the context information associated with the computing device and the contents of the document, the one or more processors are further configured to execute the virtual computer application to:

determine, based at least in part on the contents of the document, a classification of the document; and determine the one or more policies that specify the one or more actions permitted to be performed by the computing device on the document in the private network based at least in part on the context information associated with the computing device and the classification of the document.

15. The computing device of claim 14, wherein to determine the classification of the document, the one or more processors are further configured to execute the virtual computer application to:

determine, based at least in part on the contents of the document, the classification of the document using one or more machine learning techniques.

16. The computing device of claim 14, wherein the one or more processors are further configured to execute the virtual computer application to determine the one or more policies that specify the one or more actions permitted to be performed by the computing device on the document in the private network based at least in part on the context information associated with the computing device and the classification of the document is in response to the virtual computer application receiving a request from the computer device to open the document.

17. The computing device of claim 10, wherein the action to be performed by the computing device comprises one of: opening the document at the computing device, saving the document to the computing device, saving the document to an external storage device connected to the computing device, or printing the document.

18. A non-transitory computer-readable storage medium storing instructions of a virtual computer application that, when executed, cause one or more processors of a computing device to:

establish a secure communications channel between the computing device and a private network;

determine one or more policies that specify one or more actions permitted to be performed by the computing device on documents in the private network based at least in part on context information associated with the computing device;

determine whether the virtual computer application is able to control operating system-level functionalities of the computing device;

in response to determining that the virtual computer application is not able to control the operating system-level functionalities of the computing device, reduce a level of actions that can be performed by the computing device on documents in the private network;

determine whether to allow an action to be performed by the computing device on a document in the private network based at least in part on the one or more actions specified by the one or more policies; and in response to determining that the action to be performed on the document is allowed, enable the computing device to perform the action on the document.

* * * * *